United States Patent
Qi et al.

(10) Patent No.: US 11,500,088 B2
(45) Date of Patent: Nov. 15, 2022

(54) MILLIMETER-WAVE REAL-TIME IMAGING BASED SAFETY INSPECTION SYSTEM AND SAFETY INSPECTION METHOD

(71) Applicants: Shenzhen Victooth Terahertz Technology Co., Ltd., Guangdong (CN); Shenzhen Institute of Terahertz Technology and Innovation, Guangdong (CN)

(72) Inventors: Chunchao Qi, Guangdong (CN); Chengyan Jia, Guangdong (CN); Yupeng Li, Guangdong (CN)

(73) Assignees: SHENZHEN VICTOOTH TERAHERTZ TECHNOLOGY CO., LTD., Guangdong (CN); SHENZHEN INSTITUTE OF TERAHERTZ TECHNOLOGY AND INNOVATION, Guangdong (CN)

(*) Notice: Subject to any disclaimer, the term of this patent is extended or adjusted under 35 U.S.C. 154(b) by 369 days.

(21) Appl. No.: 16/635,418

(22) PCT Filed: Sep. 4, 2017

(86) PCT No.: PCT/CN2017/100401
§ 371 (c)(1),
(2) Date: Jan. 30, 2020

(87) PCT Pub. No.: WO2019/024170
PCT Pub. Date: Feb. 7, 2019

(65) Prior Publication Data
US 2021/0088649 A1    Mar. 25, 2021

(30) Foreign Application Priority Data
Jul. 31, 2017    (CN) .......................... 201710638053.X

(51) Int. Cl.
*G01S 13/90* (2006.01)
*G01S 7/41* (2006.01)
*G01S 13/88* (2006.01)

(52) U.S. Cl.
CPC ............ *G01S 13/9064* (2019.05); *G01S 7/41* (2013.01); *G01S 13/886* (2013.01); *G01S 13/887* (2013.01); *G01S 13/9029* (2013.01)

(58) Field of Classification Search
CPC ...... G01S 13/9064; G01S 7/41; G01S 13/886; G01S 13/887; G01S 13/9029
See application file for complete search history.

(56) References Cited

U.S. PATENT DOCUMENTS

2005/0104603 A1* 5/2005 Peschmann ............ G01R 27/06
324/637
2018/0362262 A1* 12/2018 Winkel .................. B65G 43/08

FOREIGN PATENT DOCUMENTS

CN    102135629 A    7/2011
CN    201936007 U    8/2011
(Continued)

OTHER PUBLICATIONS

Int'l Search Report dated Apr. 18, 2018 in Int'l Application No. PCT/CN2017/100401.
(Continued)

*Primary Examiner* — Vladimir Magloire
*Assistant Examiner* — Nazra Nur Waheed
(74) *Attorney, Agent, or Firm* — Panitch Schwarze Belisario & Nadel LLP

(57) ABSTRACT

A millimeter-wave real-time imaging based safety inspection system and safety inspection method. The safety inspection system includes a conveying device (10), a millimeter wave transceiver module (11), an antenna array (17, 18), a switch array (16*a*, 16*b*), a switch control unit (15*a*, 15*b*), a
(Continued)

quadrature demodulation and data acquisition module (12), and an image display unit (13). By using an Inverse Synthetic Aperture Radar (ISAR) imaging principle, the millimeter-wave real-time imaging based safety inspection system performs real-time imaging on an object to be inspected when the object moves, so that not only the imaging speed is improved, but also the field of view is enlarged. A safety inspector can determine whether an inspected person carries dangerous goods by observing a three-dimensional diagram of the inspected person, thereby eliminating the inconvenience caused by back-and-forth movement of a safety inspection device used by the safety inspector around the inspected person.

10 Claims, 3 Drawing Sheet

(56) References Cited

FOREIGN PATENT DOCUMENTS

| CN | 102914766 | A | * | 2/2013 | |
|----|-----------|---|---|--------|--|
| CN | 102914766 | A |   | 2/2013 | |
| CN | 102983415 | A |   | 3/2013 | |
| CN | 104375193 | A |   | 2/2015 | |
| CN | 105068125 | A |   | 11/2015 | |
| CN | 105759269 | A | * | 7/2016 | ........... G01S 13/887 |
| CN | 107543831 | A | * | 1/2018 | |
| JP | 2008145230 | A | * | 6/2008 | |
| JP | 2008145230 | A |   | 6/2008 | |

OTHER PUBLICATIONS

Office Action dated Mar. 4, 2019 in CN Application No. 201710638053.X.

* cited by examiner

MILLIMETER-WAVE REAL-TIME IMAGING BASED SAFETY INSPECTION SYSTEM AND SAFETY INSPECTION METHOD

CROSS-REFERENCE TO RELATED APPLICATIONS

This application is a Section 371 of International Application No. PCT/CN2017/100401, filed Sep. 4, 2017, which was published in the Chinese language on Feb. 7, 2019, under International Publication No. WO 2019/024170 A1, which claims priority under 35 U.S.C. § 119(b) to Chinese Application No. 201710638053.X, filed Jul. 31, 2017, the disclosures of each of which are incorporated herein by reference.

TECHNICAL FIELD

The invention belongs to the field of safety inspection systems, and more particularly, relates to a millimeter wave real-time imaging based safety inspection system and safety inspection method.

BACKGROUND

In recent years, safety issues have increasingly attracted the attention of people around the world, and higher requirements have been set for the reliability and intelligence of safety inspection systems.

Traditional metal detectors can only inspect targets in a small range at short distances, have low efficiency, and are far from meeting the demands of safety inspection. Although various rays such as X-rays have strong penetration, they can cause radiation damage to the inspected human body, thus even though currently there are X-ray machines with low-radiation dose, they are still not easily accepted by the public. Infrared imaging is based on the temperature of the surface of the object and it cannot be clear under the condition of fabric shield. A millimeter wave imaging system can not only inspect metal objects hidden under the fabric, but also inspect dangerous goods such as plastic pistol and explosives, the information obtained is more detailed and accurate, which can greatly reduce the false alarm rate. Therefore, in recent years, millimeter wave imaging technology has been more widely used in personnel safety inspection and other aspects.

Millimeter wave imaging technology uses millimeter wave radar. The millimeter wave radar refers to a radar transmitting a signal with the frequency in the millimeter wave band, and the frequency of the millimeter wave is from 30 GHz to 300 GHz (with wavelength from 1 mm to 10 mm), and in practical engineering applications, the low end frequency of the millimeter wave is often reduced to 26 GHz, in the electromagnetic spectrum, millimeter wave frequency is between microwave frequency and the infrared wave frequency. Compared with microwave, millimeter wave is typically characterized by short wavelength, wide frequency band (with a very wide utilization room), and propagation characteristics in the atmosphere. Compared with infrared, millimeter wave has the ability of all-weather operations and can be used in harsh environment such as smoke, dust and fog. In the case of increasingly crowded microwave hands, millimeter wave has the advantages of microwave, and also have some advantages that are not possessed by low-frequency microwave.

Specifically, millimeter wave has the following characteristics: 1. high accuracy, it is easier for millimeter wave radar to obtain narrow beam and large absolute bandwidth, making a millimeter wave radar system to be more resistant to electronic interference; 2. in Doppler radar, the Doppler frequency resolution of the millimeter wave is high; 3. in a millimeter wave imaging system, millimeter wave is sensitive to the shape and structure of the target, has a strong ability to distinguish metal target and background environment, and the obtained image resolution is high, and thus the ability to identify and detect target can be improved; 4. millimeter wave can penetrate the plasma; 5. compared with infrared laser, millimeter wave is less affected by harsh natural environment; 6. millimeter wave system is small in bulk and light in weight, and compared with microwave circuit, millimeter wave circuit is much smaller in size, making millimeter wave system easier to be integrated. It is these unique properties that provide millimeter wave technology with a wide range of application prospect, especially in the field of nondestructive inspection and safety inspection.

In the early development of millimeter wave imaging, millimeter wave imaging system used a single-channel mechanical scanning system; this imaging system has a simple structure but a long scanning time. In order to shorten the scanning time, Millivision Corporation developed a Veta125 imager, this imager has an 8×8 array receiving mechanism in addition to a transmission scanning system, But this imager is more suitable for large scale remote monitoring outdoors, and the field of view is less than 50 cm. Trex Corporation developed a set of PMC-2 imaging system, the antenna unit in this imaging system uses 3 mm phased array antenna technology. The PMC-2 imaging system uses a millimeter wave with a center frequency of 84 GHz. The cost of this imaging system is relatively high because its operating frequency is close to the terahertz band. Lockheed Martin Corporation has also developed a set of focal plane imaging array imaging system, which uses a millimeter wave with a center frequency of 94 GHz. TRW Corporation has developed a set of passive millimeter wave imaging system, and uses a millimeter wave with a center frequency of 89 GHz. Imaging systems of Lockheed Martin Corporation and TRW Corporation both have a smaller field of view, typically less than 50 cm.

At present, in the field of millimeter wave imaging, research results of millimeter wave imaging are mainly concentrated in the Pacific Northwest National Laboratory. Mc Makin et al., in this laboratory developed a set of three dimensional holographic imaging scanning system. The scanning mechanism of this set of imaging system is based on cylindrical scanning, and this set of system has achieved commercialization of millimeter wave imaging system. The imaging system uses an active imaging mechanism and obtains a three dimensional millimeter wave image of the target through inversion of holographic algorithm. This technology has been authorized to L-3 Communications and Save View Co., Ltd., and their products are used in safety inspection system in the places such as stations and docks, and used in trial for clothing. However, because this system uses 384 transceiver units, the cost is relatively high.

Furthermore, the millimeter wave imaging technology currently used in personnel safety inspection is based on synthetic aperture radar (SAR) imaging principle in which radar moves and target is still, which has the problems of low imaging speed and small field of view during safety inspection. In addition, when inspecting a human body by an existing safety inspection system, a safety inspector needs to use a security inspection device to move back and forth on the body of the inspected person, which is inconvenient for both the safety inspector and the inspected person.

SUMMARY

The objective of the invention is to provide a millimeter wave real-time imaging based safety inspection system to solve the problems of low imaging speed and small field of view of the millimeter wave imaging safety inspection system used in the existing safety inspection.

To achieve the above objective, the technical solution adopted by the invention is to provide a millimeter wave real-time imaging based safety inspection system, which comprises: a conveying device, which is configured to convey an object to be inspected; a millimeter wave transceiver module, which is configured to generate a millimeter wave transmission signal transmitted to the object to be inspected and receive and process an echo signal; an antenna array, connected to the millimeter wave transceiver module, wherein the antenna array comprises a transmitting antenna array and a receiving antenna array, the transmitting antenna array comprises a plurality of transmitting antennas, the receiving antenna array comprises a plurality of receiving antennas, and there is a one to one correspondence between transmitting antennas and the receiving antennas to transmit the millimeter wave transmission signal and receive the echo signal; a switch array, comprising a transmitting switch array and a receiving switch array, wherein the transmitting switch array comprises a plurality of transmitting switches, and the receiving switch array comprises a plurality of receiving switches; a switch control unit, comprising a transmitting switch control unit and a receiving switch control unit, wherein the transmitting switch control unit is electrically connected to the transmitting switch array, and the receiving switch control unit is electrically connected to the receiving switch array, so as to control on and off of transmitting switches and receiving switches according to a preset timing; a quadrature demodulation and data acquisition module, wherein an input end of the quadrature demodulation and data acquisition module is connected to the millimeter wave transceiver module, to acquire, correct and process the echo signal; and an image display unit, connected to an output end of the quadrature demodulation and data acquisition module to generate and display a three dimensional image of the object to be inspected according to the echo signal.

Further, the millimeter wave real-time imaging based safety to inspection system further comprises an alarm device connected with the quadrature demodulation and data acquisition module, and configured to warn existence of dangerous goods.

Further, the millimeter wave real-time imaging based safety inspection system further comprises a door device, wherein the conveying device passes through the door device, and the millimeter wave transceiver module and the antenna array are disposed on the door device.

Further, the conveying device comprises: a belt, passing through the door device and is used to convey the object to be inspected; and a motor, drivingly connected to the belt to drive the belt to move.

Further, the millimeter wave transceiver module comprises: a transmitting link, configured to generate the millimeter wave transmission signal transmitted to the object to be inspected; a receiving link, configured to receive the echo signal returned from the object to be inspected, and process the echo signal to transmit to the quadrature demodulation and data. acquisition module; and a correction loop, configured to correct linearity of an input voltage of a first oscillation source and correct a frequency of the millimeter wave transmission signal.

Further, the transmitting link comprises: the first oscillation source, being a voltage-controlled oscillation source working in a first frequency range; a first power divider, having an input end connected to the voltage-controlled oscillation source; a first power amplifier, connected to an output end of the first power divider to amplify a power of an output signal of the first power divider to reach a driving power range of a first frequency doubler; the first frequency doubler, doubling a frequency of a signal output from the first power amplifier to a second frequency range, and outputting the doubled signal to a first filter; the first filter, suppressing a spurious signal generated from the first frequency doubler and outputting a filtered signal to a second power amplifier; the second power amplifier, performing power amplification on the signal output from the first filter to reach a driving power range of a second frequency doubler; the second frequency doubler, doubling a frequency of a signal output from the second power amplifier to a third frequency range, and outputting the doubled signal to a second filter; the second filter, suppressing the spurious signal generated by the second frequency doubler and outputting a filtered signal to a third power amplifier; the third power amplifier, performing power amplification on the signal output from the second filter, and outputting the amplified signal to an input port of a second power divider; the second power divider, outputting an output signal of the third power amplifier to the fourth power amplifier through an output port; the fourth power amplifier, outputting a signal from one of the output ports of the second power divider to a local oscillator port of a first quadrature mixer; the first quadrature mixer, orthogonally mixing a transmitted intermediate frequency signal of a transmitting intermediate frequency link and the output signal of the fourth power amplifier, wherein a radio frequency end obtains and outputs the mixed millimeter wave signal to a fifth power amplifier; and the fifth power amplifier, performing power amplification on the mixed signal at the radio frequency end of the first quadrature mixer and outputs the amplified signal to the transmitting antenna.

Further, the receiving link comprises: a first low-noise amplifier, amplifying and outputting a millimeter wave signal received from the receiving antenna to a radio frequency input port of a second quadrature mixer; and the second quadrature mixer, wherein a transmission signal corning from a second output port of the second power divider and amplified by a sixth power amplifier and the signal from the first low-noise amplifier are input into a local oscillator port of the second quadrature mixer and are orthogonally mixed to obtain an output intermediate frequency signal; wherein the output intermediate frequency signal feeds a signal carrying information regarding the object to be inspected to the quadrature demodulation and data acquisition module for processing and analysis.

Further, the correction loop comprises: a seventh power amplifier, amplifying and outputting another output signal from the first power divider to a first divider, having an output frequency range a fourth frequency range; the first divider, outputting the output signal to the third filter for filtering, the filtered signal being outputted to a second divider having an output frequency range of a fifth frequency range; and the second divider, outputting the output signal to a fourth filter for filtering, the filtered signal being outputted to the quadrature demodulation and data acquisition module to correct an input voltage of the voltage-controlled oscillation source.

Further, the first frequency range is from F1 to F2, the second frequency range is from 2F1 to 2F2, the third frequency range is front 4F1 to 4F2, the fourth frequency range is from F1/x to F2/x, and the fifth frequency range is from F1/xy to F2/xy, where x and y are integers greater than 1.

Further, in the quadrature demodulation and data acquisition module, the echo signal from the millimeter wave transceiver module is demodulated and. acquired, is associated with a spatial position signals, and then is Fourier transformed and inverse Fourier transformed to obtain a three-dimensional image.

To achieve the above purpose, the invention also provides a safety inspection method for inspecting an object to be inspected by using the above millimeter wave real-time imaging based safety inspection system, comprising the following steps: S1: the conveying device moves the object to be inspected; S2: the millimeter wave transceiver module generates a millimeter wave transmission signal; S3: the switch control unit controls the switch array according to a preset timing; S4: the switch array controls the transmitting and receiving of the antenna array according to the preset timing, so that the correspondingly disposed transmitting antennas and receiving antennas transmit and receive a millimeter wave in sequence; wherein the transmitting antenna transmits the millimeter wave transmission signal generated by the millimeter wave transceiver module to the object to be inspected, and the receiving antenna receives an echo signal returned from the object to be inspected and transmits the echo signal to the millimeter wave transceiver module; S5: the millimeter wave transceiver module processes the echo signal and then transmits the processed echo signal to the quadrature demodulation and data acquisition module; S6: the quadrature demodulation and data acquisition module acquires, corrects and processes the signal from the millimeter wave transceiver module; and S7: the three dimensional image of the object to be inspected is generated from the processed signal and displayed on the image display unit.

Further, the millimeter wave real-time imaging based safety inspection system comprises an alarm device, and the safety inspection method further comprises step S8: the alarm device warns existence of dangerous goods in the object to be inspected.

The beneficial effects of the millimeter wave real-time imaging based safety inspection system provided by the invention are as follows:

1. by using an inverse synthetic aperture radar (ISAR) imaging principle in which radar is still and target moves, performing real-time imaging of the object to be inspected when it moves, compared with the millimeter wave imaging system used in existing safety inspection system, the imaging speed is improved. In addition, compared with synthetic aperture radar (SAR) imaging, which generally can only obtain a field of view of less than 50 cm, the field of view of inverse synthetic aperture radar (ISAR) imaging can be of several meters or even tens of meters, greatly enlarging the field of view, thereby enlarging the observation range of safety inspector.

2. by moving the object to be inspected through the conveying device 10, when the object to be inspected is a person, a three dimensional graphic of the person to be inspected is generated and displayed on the image display unit 13 during his movement; a safety inspector can determine whether an person to be inspected carries dangerous goods by observing the three-dimensional diagram of the body of the person to be inspected, thereby eliminating the inconvenience caused by back and forth movement of a safety inspection device used by the safety inspector on the body of the person to be inspected.

3. the switch array is composed of a plurality of switches, and the antenna array is composed of a plurality of antennas, the switch control unit controls the switch array according to a preset timing, so that the switch array controls the transmitting and receiving of each antenna in the antenna array according to the timing, and each correspondingly disposed transmitting antenna and receiving antenna can transmit and receive the millimeter wave in sequence according to the movement of the object to be inspected. As a result, only one millimeter wave transceiver module 11 is needed to scan different parts of the object to be inspected at different locations. Compared to existing imaging systems providing one signal transceiver module for each pair of antennas, the number of signal transceiver modules is decreased, thereby reducing cost.

BRIEF DESCRIPTION OF THE DRAWINGS

In order to more clearly illustrate the technical solutions in the embodiments of the invention, the drawings to be used for description of the embodiments or prior art are briefly introduced below. Obviously, the drawings in the following description are some embodiments of the invention, and those of ordinary skilled in the art can obtain other drawings according to these drawings without paying creative effort.

Figure 1:
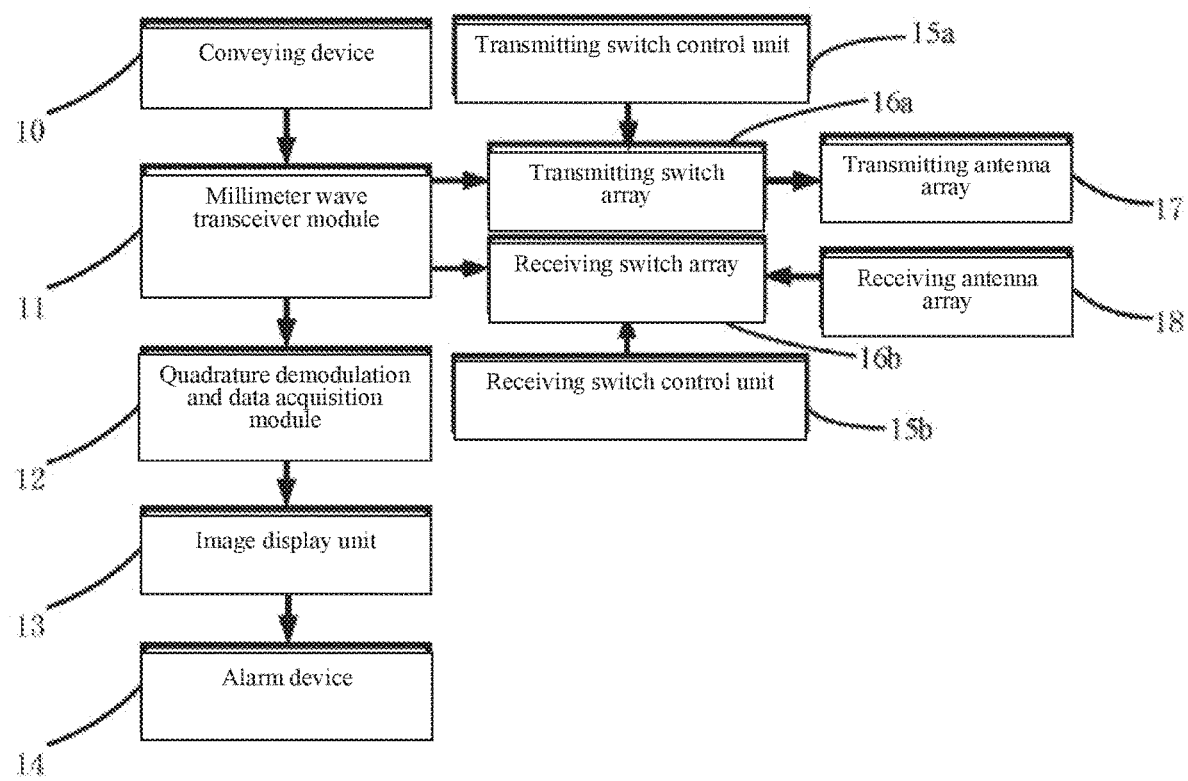
FIG. 1 is a composition block diagram of a millimeter wave real-time imaging based safety inspection system according to an embodiment of the invention.

Wherein, each reference numeral in the figures:

10 conveying device; 11 millimeter wave transceiver module; 12 quadrature demodulation and data acquisition module; 13 image display unit; 14 alarm device; 15a transmitting switch control unit; 15b receiving switch control unit; 16a transmitting switch array; 16b receiving switch array; 17 transmitting antenna array; 18 receiving antenna array; 19 door device; 23 belt; 24 motor; 301 first oscillation source; 302 first power divider; 303 first power amplifier; 304 first frequency doubler; 305 first filter; 306 second power amplifier; 307 second frequency doubler; 308 second filter; 309 third power amplifier; 310 second power divider; 311 fourth power amplifier; 312 first quadrature mixer; 313 fifth power amplifier; 314 first low-noise amplifier; 315 second quadrature mixer; 316 sixth power amplifier; 317 seventh power amplifier; 318 first divider; 319 third filter; 320 second divider; 321 fourth filter.

DETAILED DESCRIPTION OF EMBODIMENTS

To facilitate the understanding to the technical problem, technical solution and beneficial effect of the invention, the invention will be further described in detail below with reference to the accompanying drawings and embodiments. It should be understood that the specific embodiments described herein are only to explain the invention and are not intended to limit the invention.

It needs to be noted that when an element is referred to as "fixed on" or "disposed on" another element, it may be directly on the other element or indirectly on the other element. When an element is referred to as "connected to" another element, it can be directly connected to the other element or indirectly connected to the other element.

It needs to be understood that, the orientation or positional relationship indicated by the terms "length", "width", "upper", "lower", "front", "rear", "left", "right", "vertical", "horizontal", "top", "bottom", "inner", "outer" etc. is based on the orientation or positional relationship shown in the drawings; these terms are only for ease of describing the invention and simplifying the description, and are not to indicate or imply that a described device or element must have a specific orientation or be constructed and operated in a specific orientation, and therefore cannot be understood to limit the invention.

In addition, the terms "first" and "second" are used for descriptive purposes only and cannot be understood as indicating or implying relative importance or implicitly indicating the number of technical features indicated. Therefore, the features defined by "first" and "second" may explicitly or implicitly include one or more of the features. In the description of the invention, the meaning of "a plurality of" is two or more, unless expressly and specifically defined otherwise.

In order to solve the problems of low imaging speed and small field of view in the millimeter wave imaging based safety inspection system used in existing safety inspection, the invention provides a millimeter wave real-time imaging based safety inspection system and safety inspection method.

Figure 2:
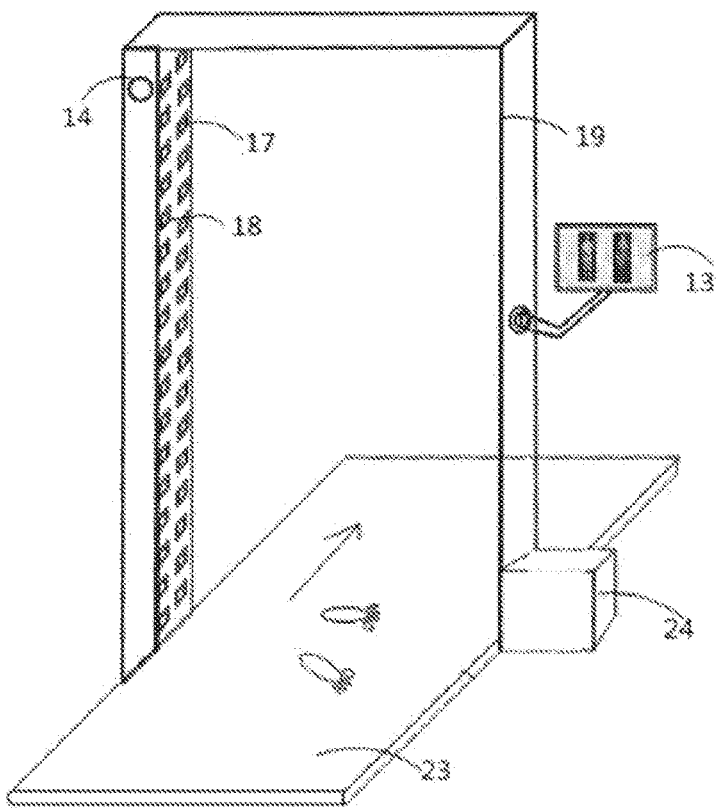
FIG. 2 is a structural diagram of a millimeter wave real-time imaging based safety inspection system according to an embodiment of the invention.

As shown in FIGS. 1 and 2, a millimeter wave real-time imaging based safety inspection system includes: a conveying device 10, the conveying device 10 is used to convey an object to be inspected; a millimeter wave transceiver module 11, the millimeter wave transceiver module 11 is used to generate millimeter wave transmission signal transmitted to the object to be inspected and receive and process echo signal; an antenna array, the antenna array is connected to the millimeter wave transceiver module 11, the antenna array includes a transmitting antenna array 17 and a receiving antenna array 18; the transmitting antenna array 17 includes a plurality of transmitting antennas, the receiving antenna array 18 includes a plurality of receiving antennas, and there is a one to one correspondence between the transmitting antennas the receiving antennas to transmit a millimeter wave transmission signal and receive an echo signal; a switch array, the switch array includes a transmitting switch array 16a and a receiving switch array 16b; the transmitting switch array 16a comprises a plurality of transmitting switches, and the receiving switch array 16b comprises a plurality of receiving switches; a switch control unit, the switch control unit includes a transmitting switch control unit 15a and a receiving switch control unit 15b; the transmitting switch control unit 15a is electrically connected to the transmitting switch array 16a, the receiving switch control unit 15b is electrically connected to the receiving switch array 16b, so as to control on and off of transmitting switches and receiving switches according to a preset timing; a quadrature demodulation and data acquisition module 12, an input end of the quadrature demodulation and data acquisition module 12 is connected to the millimeter wave transceiver module 11, to acquire, correct and process echo signal; an image display unit 13, the image display unit 13 is connected to the output end of the quadrature demodulation and data acquisition module 12 to generate and display a three dimensional image of the object to be inspected according to the echo signal.

Figure 4:
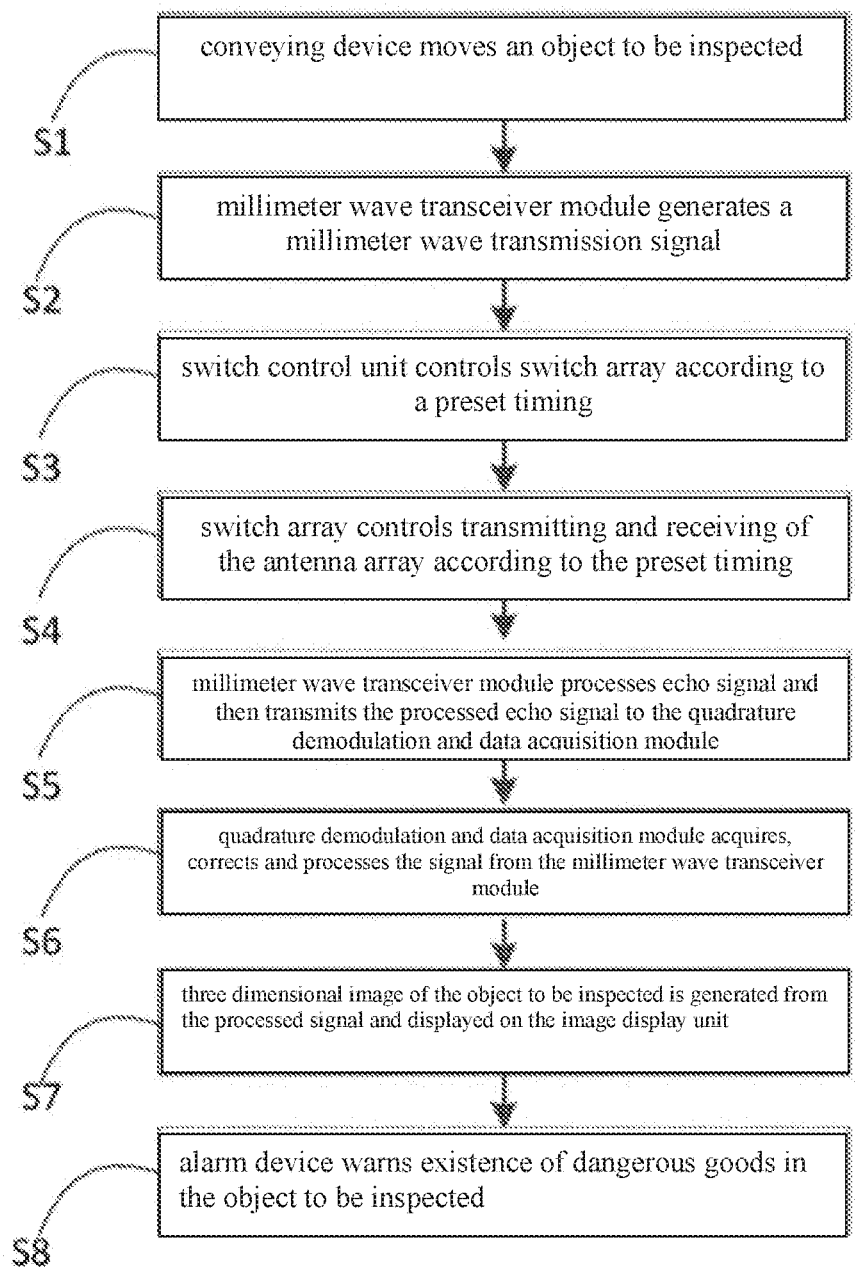
FIG. 4 is a flowchart of a millimeter wave real-time imaging based safety inspection method according to an embodiment of the invention.

Referring to FIG. 4, when using the millimeter wave real-time imaging based safety inspection system to inspect the object to be inspected, it includes the following steps: S1: the conveying device 10 moves the object to be inspected; S2: the millimeter wave transceiver module 11 generates a millimeter wave transmission signal; S3: the switch control unit controls the switch array; S4: the switch array controls the transmitting and receiving of the antenna array according to the preset timing, so that the correspondingly disposed transmitting antennas and receiving antennas transmit and receive a millimeter wave in sequence; wherein the transmitting antenna transmits the millimeter wave transmission signal generated by the millimeter wave transceiver module 11 to the object to be inspected, and the receiving antenna receives an echo signal returned from the object to be inspected and transmits the echo signal to the millimeter wave transceiver module 11; S5: the millimeter wave transceiver module 11 processes the echo signal and then transmits the processed echo signal to the quadrature demodulation and data acquisition module 12; S6: the quadrature demodulation and data acquisition module 12 acquires, corrects and processes the signal from the millimeter wave transceiver module 11; S7: the three dimensional image of the object to be inspected is generated from the processed signal and displayed on the image display unit 13.

The millimeter wave real-time imaging based safety inspection system uses the inverse synthetic aperture radar (ISAR) imaging principle in which radar is still and target moves, by imaging a moving target with a still radar, real-time and accurate imaging of the moving target can be achieved. Therefore, during safety inspection, the object to be inspected is moved by the conveying device 10, during movement of the object to be inspected, the millimeter wave transceiver module 11 first generates a transmission signal transmitted to the object to be inspected via the transmitting antenna, and the object to be inspected returns an echo signal with its information to the receiving antenna; the receiving antenna receives the echo signal and then transmits it to the millimeter wave transceiver module 11 and the quadrature demodulation and data acquisition module 12 in sequence, the echo signal with the information of the object to be inspected, after being acquired, corrected and processed by the quadrature demodulation and data acquisition module 12, is transmitted the image display unit 13, and a three dimensional image of the object to be inspected is generated and displayed in the image display unit 13. The safety inspector can know whether the object to be inspected carries dangerous goods by observing a three-dimensional diagram of the object to be inspected. This millimeter wave real-time imaging based safety inspection system has the following advantages:

1. by using the inverse synthetic aperture radar (ISAR) imaging principle in which radar is still and target moves, performing real-time imaging of the object to be inspected when it moves, compared with the millimeter wave imaging system used in existing safety inspection system, the imaging speed is improved. In addition, compared with synthetic aperture radar (SAR) imaging, which generally can only obtain a field of view of less than 50 cm, the field of view of inverse synthetic aperture radar (ISAR) imaging can be of several meters or even tens of meters, greatly enlarging the field of view, thereby enlarging the observation range of safety inspector.

2. by moving the object to be inspected through the conveying device 10, when the object to be inspected is a person, a three dimensional graphic of the person to be inspected is generated and displayed on the image display unit 13 during his movement; a safety inspector can determine whether an person to be inspected carries dangerous goods by observing the three-dimensional diagram of the body of the person to be inspected, thereby eliminating the inconvenience caused by back and forth movement of a safety inspection device used by the safety inspector on the body of the person to be inspected.

3. the switch array is composed of a plurality of switches, and the antenna array is composed of a plurality of antennas, the switch control unit controls the switch array according to a preset timing, so that the switch array controls the transmitting and receiving of each antenna in the antenna array according to the timing, and each correspondingly disposed transmitting antenna and receiving antenna can transmit and receive the millimeter wave in sequence according to the movement of the object to be inspected. As a result, only one millimeter wave transceiver module 11 is needed to scan different parts of the object to be inspected at different locations. Compared to existing imaging systems providing one signal transceiver module for each pair of antennas, the number of signal transceiver modules is decreased, thereby reducing cost.

Optionally, in order to save labor, the millimeter wave real-time imaging based safety inspection system further includes an alarm device 14. The alarm device 14 is connected to the quadrature demodulation and data acquisition module 12 When performing safety inspection, step S8 is also included: when dangerous goods information exists in the three dimensional image displayed by the image display unit 13, the alarm device 14 sends an alarm signal to warn the safety inspector of the dangerous goods. Optionally, the alarm device 14 may be a buzzer.

Referring to FIG. 2, the millimeter wave real-time imaging based safety inspection system further includes a door device 19, the conveying device 10 passes through the door device 19, and the millimeter wave transceiver module 11 and the antenna array are disposed on the door device 19. The conveying device 10 includes a belt 23, the belt 23 passes through the door device 19, and the belt 23 is used to convey the object to be inspected; a motor 24, the motor 24 is drivingly connected to the belt 23 to drive the belt 23 to move.

Specifically, N transmitting antennas and N receiving antennas are fixed on each side of the door device 19 to form a row of transmitting antenna arrays 17 and a row of receiving antenna arrays 18; a switch array, a switch control unit, and a quadrature demodulation and data acquisition unit 12 are installed on the rear side of the antenna array; an image display unit 13 and an alarm device 14 are installed on one side of the door device 19, wherein N is an integer greater than or equal to two.

In addition, the N millimeter wave transmitting antennas and the N receiving antennas are controlled to perform transmitting and receiving of millimeter wave signal a plurality of times according to the timing in order to complete the acquisition of echo signals from the front and rear side of the moving object to be inspected. For example, the control of the N millimeter wave transmitting antennas may be implemented by a single-pole multi-throw switch, and of course, may also be implemented by using any timing control known in the art.

It needs also to be noted that the number of transmitting antennas and corresponding receiving antennas can be set according to parameters such as the height of the door device 19 and the imaging speed to be achieved, while the height of the door device 19 can be determined according to the height of the object to be inspected, in addition, the horizontal distance between the side wall of the door device 19 and the footprint of the person to be inspected may be determined according to indicators such as antenna parameters. The settings of the dimensions mentioned above are obvious to those skilled in the art, and therefore will not be described in detail.

For example, one millimeter wave transceiver module 11 can input a millimeter wave signal to one single-pole four-throw switch, and this single-pole four-throw switch can input the millimeter wave signal to four single-pole four-throw switches; these four single-pole four-throw switches can in turn input the millimeter wave signal to sixteen single-pole four-throw switches, so that there can be 64 transmitting antennas, thereby forming the transmitting antenna array 17 for transmitting the transmission millimeter wave signal to different positions of the human body. As mentioned above, the 64 transmitting antennas do not work simultaneously, but are controlled by, for example, three layers of single-pole four-throw switches, such that they transmit one by one; of course, single-pole five-throw switch or other single-pole multi-throw switches can also be used for controlling the number of transmitting antennas and receiving antennas.

In this embodiment, the millimeter wave transceiver module 11 includes a transmitting link, a receiving link, and a correction loop. wherein, the transmitting link is used to generate a millimeter wave transmission signal transmitted to the object to be inspected; the receiving link is used to receive the echo signal returned from the object to be inspected, and process and transmit the echo signal to the quadrature demodulation and data acquisition module 12; the correction loop is used to correct linearity of input voltage of a first oscillation source and correct a frequency of the millimeter wave transmission signal.

Figure 3:
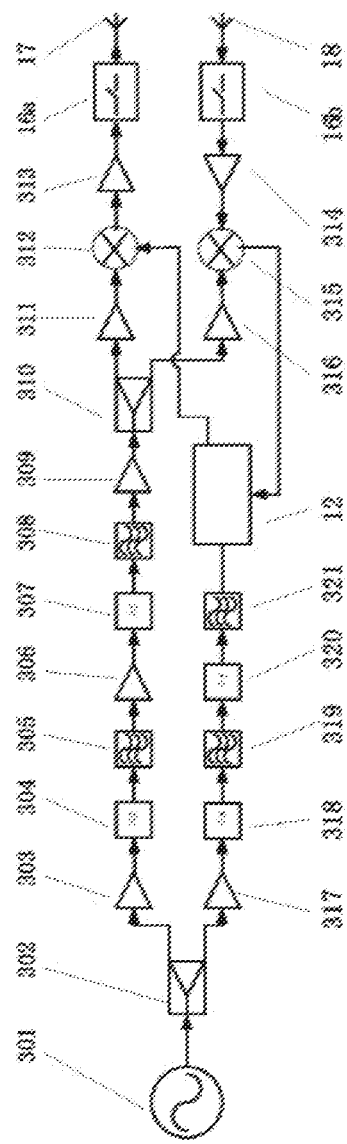
FIG. 3 is a circuit diagram of a millimeter wave transceiver module in a millimeter wave real-time imaging based safety inspection system according to an embodiment of the invention.

Further, as shown in FIG. 3, the transmitting link includes a first oscillation source 301, a first power divider 302, a first power amplifier 303, a first frequency doubler 304, a first filter 305, a second power amplifier 306, a second frequency doubler 307, a second filter 308, a third power amplifier 309, a second power divider 310, a fourth power amplifier 311, a first quadrature mixer 312, and a fifth power amplifier 313, which are connected in sequence. The first oscillation source 301 is a voltage-controlled oscillation source working in a first frequency range; the first power amplifier 303 amplifies a power of an output signal of the first power divider 302 to reach a driving power range of the first frequency doubler 304; the first frequency doubler 304 doubles a frequency of a signal output from the first power amplifier 303 to a second frequency range, and outputs the doubled signal to the first filter 305; the first filter 305 suppresses the spurious signal generated from the first frequency doubler 304 and outputs a filtered signal to the second power amplifier 306; the second power amplifier 306 performs power amplification on the signal output from the first filter 305 to reach a driving power range of the second frequency doubler 307; the second frequency doubler 307 doubles a frequency of a signal output from the second power amplifier 306 to a third frequency range, and outputs the doubled signal to the second filter 308; the second filter 308 suppresses a spurious signal generated from the second frequency doubler 307, and outputs the filtered signal to the third power amplifier 309; the third power amplifier 309 performs power amplification on the signal output from the second filter 308, and outputs the amplified signal to an input port of the second power divider 310; the second power divider 310 outputs an output signal of the third power amplifier 309 to the fourth power amplifier 311 through an output port; the fourth power amplifier 311 outputs a signal from one of the output ports of the second power divider 310 to a local oscillator port of the first quadrature mixer 312; the first quadrature mixer 312 orthogonally mixes a transmitted intermediate frequency signal of a transmitting intermediate frequency link and the output signal of the fourth power amplifier 311, wherein a radio frequency end obtains and outputs the mixed millimeter wave signal to the fifth power amplifier 313; and the fifth power amplifier 313 performs power amplification on the mixed signal at the radio frequency end of the first quadrature mixer 312 and outputs the amplified signal to the transmitting antenna.

The frequency and power of the transmission signal are increased through multi-stage frequency doubling, multi-stage amplification, and multi-stage filtering.

Further, the receiving link includes a first low-noise amplifier 314 and a second quadrature mixer 315, which are connected to each other. The first low-noise amplifier 314 amplifies and outputs a millimeter wave signal received from the receiving antenna to a radio frequency input port of the second quadrature mixer 315; a transmission signal coming from a second output port of the second power divider 310 and amplified by a sixth power amplifier 316 and the signal from the first low-noise amplifier 314 are input into a local oscillator port of the second quadrature mixer 315 and are orthogonally mixed to obtain an output intermediate frequency signal. The output intermediate frequency signal feeds a signal carrying information regarding the object to be inspected to the quadrature demodulation and data acquisition module 12 for processing and analysis.

Still further, the correction loop includes a seventh power amplifier 317, a first divider 318, and a second divider 320. The seventh power amplifier 317 amplifies and outputs another output signal from the first power divider 302 to the first divider 318; an output frequency range of the first divider 318 is a fourth frequency range; the first divider 318 outputs a signal to a third filter 319 for filtering, and the third filter 319 outputs the filtered signal to the second divider 320; an output frequency range of the second divider 320 is a fifth frequency range; and the second divider 320 outputs a signal to a fourth filter 321 for filtering, and the fourth filter 321 outputs the filtered signal to the quadrature demodulation and data acquisition module 12 to correct an input voltage of the voltage-controlled oscillation source.

In this embodiment, the first frequency range is from F1 to F2, the second frequency range is from 2F1 to 2F2, the third frequency range is from 4F1 to 4F2, the fourth frequency range is from F1/x to F2/x, and the fifth frequency range is from F1/xy to F2/xy, where x and y are integers greater than 1, and specific value thereof is selected according to processing capacity of the data acquisition unit.

Further, in the quadrature demodulation and data acquisition module 12, the echo signal from the millimeter wave transceiver module 11 is demodulated and acquired; the echo signal is associated with the spatial position signals, and then is Fourier transformed and inverse Fourier transformed to obtain a three-dimensional image.

Compared with existing millimeter wave imaging instrument, the above millimeter wave real-time imaging based safety detection system of the invention has the following outstanding advantages:

(1) low in price: a motor is used in this invention to make the conveying device realize the scanning effect of the area array, which greatly reduces the cost.

(2) simple in structure and easy to integration: a plurality of single-pole multi-throw switches are used in this invention to control the working sequence of millimeter wave transmitting antennas and receiving antennas, and frequency modulation signal sources and millimeter wave devices are used to build the system, which greatly reduces the complexity of the system and also improves integration level of the system.

(3) high resolution: frequency modulation continuous wave technology, superheterodyne technology, and inverse synthetic aperture imaging technology are used in this invention to improve the resolution of plane and depth of the three dimensional image.

(4) fast imaging: a conveying belt is used to convey the object to he inspected to move in the forward direction, and the imaging can be realized by moving from one side to the other side of the door device, which saves user's time and greatly improves the imaging speed.

(5) increased field of view: compared with the existing field of view of less than 50 cm, the embodiments of the invention can realize a field of view of several meters, or even tens of meters.

(6) high signal-to-noise ratio: the system uses active millimeter wave imaging, and increases the transmitting power of the antenna by controlling the output power range of each millimeter wave device; of course, the transmitting power is within a safe radiation range, making signal-to-noise ratio of echo signal is much higher than that of the signal received by the passive millimeter wave imaging system, and thus obtains a higher imaging quality.

(7) wide range of use: by using the advantages of high resolution and simple structure of millimeter wave imaging technology, this system can inspect the damage of outer layer of various large-scale instruments and is also suitable for inspecting contraband.

The above description is only the preferred embodiments of the invention and is not intended to limit the invention, and any modification, equivalent substitution, and improvement made within the spirit and principle of the invention shall be included in the scope of the invention

What is claimed is:
1. A millimeter wave real-time imaging based safety inspection system, comprising:
a conveyor configured to convey an object to be inspected;
a millimeter wave transceiver configured to generate a millimeter wave transmission signal transmitted to the object to be inspected and receive and process an echo signal;
an antenna array, connected to the millimeter wave transceiver, wherein the antenna array comprises a transmitting antenna array and a receiving antenna array, the transmitting antenna array comprises a plurality of transmitting antennas, the receiving antenna array comprises a plurality of receiving antennas, and there is a one to one correspondence between the transmitting antennas and the receiving antennas to transmit the millimeter wave transmission signal and receive the echo signal;

a switch array, comprising a transmitting switch array and a receiving switch array, wherein the transmitting switch array comprises a plurality of transmitting switches, and the receiving switch array comprises a plurality of receiving switches;

a switch controller, comprising a transmitting switch controller and a receiving switch controller, wherein the transmitting switch controller is electrically connected to the transmitting switch array, and the receiving switch controller is electrically connected to the receiving switch array, so as to control on and off of the transmitting switches and receiving switches according to a preset timing;

a quadrature demodulator, wherein an input end of the quadrature demodulator is connected to the millimeter wave transceiver, to acquire, correct and process the echo signal; and an image display unit, connected to an output end of the quadrature demodulator to generate and display a three dimensional image of the object to be inspected according to the echo signal wherein the millimeter wave transceiver comprises:

a transmitting link, configured to generate the millimeter wave transmission signal transmitted to the object to be inspected;

a receiving link, configured to receive the echo signal returned from the object to be inspected, and process the echo signal to transmit to the quadrature demodulator; and a correction loop, configured to correct linearity of an input voltage of a first oscillation source and correct a frequency of the millimeter wave transmission signal; and wherein the transmitting link comprises:

the first oscillation source, being a voltage-controlled oscillation source working in a first frequency range;

a first power divider, having an input end connected to the voltage-controlled oscillation source; a first power amplifier, connected to an output end of the first power divider to amplify a power of an output signal of the first power divider to reach a driving power range of a first frequency doubler;

the first frequency doubler, doubling a frequency of a signal output from the first power amplifier to generate a first doubled signal with a second frequency range, and outputting the first doubled signal to a first filter;

the first filter, suppressing a spurious signal generated from the first frequency doubler, and outputting a filtered signal to a second power amplifier;

the second power amplifier, performing power amplification on the signal output from the first filter to reach a driving power range of a second frequency doubler;

the second frequency doubler, doubling a frequency of a signal output from the second power amplifier to generate a second doubled signal with a third frequency range, and outputting the second doubled signal to a second filter;

the second filter, suppressing a spurious signal generated from the second frequency doubler, and outputting a filtered signal to a third power amplifier;

the third power amplifier, performing power amplification on the signal output from the second filter to generate a first amplified signal, and outputting the first amplified signal to an input port of a second power divider;

the second power divider, outputting an output signal of the third power amplifier to a fourth power amplifier through an output port;

the fourth power amplifier, outputting a signal from one of the output ports of the second power divider to a local oscillator port of a first quadrature mixer;

the first quadrature mixer, orthogonally mixing a transmitted intermediate frequency signal of a transmitting intermediate frequency link and the output signal of the fourth power amplifier, wherein a radio frequency end obtains and outputs the mixed millimeter wave signal to a fifth power amplifier; and the fifth power amplifier, performing power amplification on the mixed signal at the radio frequency end of the first quadrature mixer to generate a second amplified signal and outputs the second amplified signal to the transmitting antenna.

2. The millimeter wave real-time imaging based safety inspection system according to claim 1, further comprising an alarmer connected to the quadrature demodulator, and configured to warn existence of dangerous goods.

3. The millimeter wave real-time imaging based safety inspection system according to claim 1, further comprising a door device, wherein the conveyor passes through the door device, and the millimeter wave transceiver and the antenna array are disposed on the door device.

4. The millimeter wave real-time imaging based safety inspection system according to claim 3, wherein the conveyor comprises:

a belt, passing through the door device and being used to convey the object to be inspected; and a motor, drivingly connected to the belt to drive the belt to move.

5. The millimeter wave real-time imaging based safety inspection system according to claim [[5]]1, wherein the receiving link comprises:

a first low-noise amplifier, amplifying and outputting a millimeter wave signal received from the receiving antenna to a radio frequency input port of a second quadrature mixer; and the second quadrature mixer, wherein a transmission signal coming from a second output port of the second power divider and amplified by a sixth power amplifier and the signal from the first low-noise amplifier are input into a local oscillator port of the second quadrature mixer and are orthogonally mixed to obtain an output intermediate frequency signal;

wherein the output intermediate frequency signal feeds a signal carrying information regarding the object to be inspected to the quadrature demodulator for processing and analysis.

6. The millimeter wave real-time imaging based safety inspection system according to claim 1, wherein the correction loop comprises:

a seventh power amplifier, amplifying and outputting another output signal from the first power divider to a first divider having an output frequency range of a fourth frequency range;

the first divider, outputting the output signal to a third filter for filtering to generate a first filtered signal, the first filtered signal being outputted to a second divider having an output frequency range of a fifth frequency range; and the second divider, outputting the output signal to a fourth filter for filtering to generate a second filtered signal, the second filtered signal being outputted to the quadrature demodulator to correct an input voltage of the voltage-controlled oscillation source.

7. The millimeter wave real-time imaging based safety inspection system according to claim 6, wherein the first frequency range is from F1 to F2, the second frequency range is from 2F1 to 2F2, the third frequency range is from 4F1 to 4F2, the fourth frequency range is from F1/x to F2/x, and the fifth frequency range is from F1/xy to F2/xy, where x and y are integers greater than 1.

8. The millimeter wave real-time imaging based safety inspection system according to claim 1, wherein in the quadrature demodulator, the echo signal from the millimeter wave transceiver is demodulated and acquired, is associated with a spatial position signals, and then is Fourier transformed and inverse Fourier transformed to obtain a three-dimensional image.

9. A safety inspection method for inspecting an object to be inspected by using the millimeter wave real-time imaging based safety inspection system according to claim 1, comprising the following steps:
- S1: the conveyor device moves the object to be inspected;
- S2: the millimeter wave transceiver generates a millimeter wave transmission signal;
- S3: the switch controller controls the switch array according to a preset timing;
- S4: the switch array controls the transmitting and receiving of the antenna array according to the preset timing, so that the correspondingly set transmitting antennas and receiving antennas transmit and receive a millimeter wave in sequence, wherein the transmitting antenna transmits the millimeter wave transmission signal generated by the millimeter wave transceiver to the object to be inspected, and the receiving antenna receives an echo signal returned from the object to be inspected and transmits the echo signal to the millimeter wave transceiver;
- S5: the millimeter wave transceiver module processes the echo signal and then transmits the processed echo signal to the quadrature demodulator;
- S6: the quadrature demodulator acquires, corrects and processes the signal from the millimeter wave transceiver; and
- S7: the three dimensional image of the object to be inspected is generated from the processed signal and displayed on the image display unit.

10. The safety inspection method according to claim 9, wherein the millimeter wave real-time imaging based safety inspection system comprises an alarmer, and the safety inspection method further comprises step S8: the alarmer warns existence of dangerous goods in the object to be inspected.

* * * * *